United States Patent
Bisson et al.

(10) Patent No.: US 8,176,018 B1
(45) Date of Patent: May 8, 2012

(54) INCREMENTAL FILE SYSTEM DIFFERENCING

(75) Inventors: Timothy Bisson, Sunnyvale, CA (US); Shankar Pasupathy, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 718 days.

(21) Appl. No.: 12/112,651

(22) Filed: Apr. 30, 2008

(51) Int. Cl.
G06F 17/30 (2006.01)

(52) U.S. Cl. .................... 707/690; 707/697

(58) Field of Classification Search .............. None
See application file for complete search history.

(56) References Cited

U.S. PATENT DOCUMENTS

| | | | |
|---|---|---|---|
| 6,993,539 B2 | 1/2006 | Federwisch | |
| 7,562,077 B2 | 7/2009 | Bisson et al. | |
| 7,624,106 B1 | 11/2009 | Manley et al. | |
| 7,831,789 B1 * | 11/2010 | Per et al. | 711/162 |
| 7,865,608 B1 * | 1/2011 | Schuba et al. | 709/231 |
| 7,921,110 B1 | 4/2011 | Ting et al. | |
| 2005/0097313 A1 * | 5/2005 | Bolosky et al. | 713/150 |
| 2006/0068755 A1 * | 3/2006 | Shraim et al. | 455/410 |
| 2006/0075294 A1 * | 4/2006 | Ma et al. | 714/13 |
| 2006/0218135 A1 * | 9/2006 | Bisson et al. | 707/4 |
| 2008/0091945 A1 * | 4/2008 | Princen et al. | 713/170 |
| 2008/0195583 A1 * | 8/2008 | Hsu et al. | 707/3 |
| 2008/0222420 A1 * | 9/2008 | Serret-Avila | 713/176 |

OTHER PUBLICATIONS

DeCandia et al., Dynamo: Amazon's Highly Available Key-value Store, Oct. 2007, http://www.allthingsdistributed.com/files/amazon-dynamo-sosp2007.pdf.*
U.S. Appl. No. 11/093,074, T. Bisson.
U.S. Appl. No. 10/954,381, S. Manley.
U.S. Appl. No. 10/776,057, D. Ting.
Co-pending U.S. Appl. No. 13/160,474, filed Jun. 14, 2011.
Co-pending U.S. Appl. No. 13/160,481, filed Jun. 14, 2011.

* cited by examiner

*Primary Examiner* — Syed H Hasan
(74) *Attorney, Agent, or Firm* — Perkins Coie LLP (57) ABSTRACT

A facility for comparing two datasets and identifying metadata differences between the two datasets irrespective of the manner in which the data is stored. In some embodiments, the facility includes a comparison unit and a catalog unit. The comparison unit compares a hierarchical hash of a first dataset with a hierarchical hash of a second dataset, the hierarchical hashes each including a plurality of hierarchical hash values, to identify differences in metadata of the first and second datasets by progressively comparing the hierarchical hash values of the first and second hierarchical hashes without comparing the metadata of the first and second datasets. The catalog unit generates a catalog of differences between the first and second datasets, the catalog indicating differences in metadata of the first and second datasets.

17 Claims, 10 Drawing Sheets

INCREMENTAL FILE SYSTEM DIFFERENCING

FIELD OF THE INVENTION

At least one embodiment of the present invention pertains to storage systems, and more particularly, to a method and apparatus to generate information describing the differences between two structured or unstructured datasets.

BACKGROUND

Businesses generate and maintain enormous stores of data. Typically, such data stores are located on one or more network storage devices. For example, data may be stored on a Network Attached Storage (NAS) appliance, a Storage Area Network (SAN), or some combination of these systems. Any one or more multiple types of disk storage (Fibre Channel, SCSI, ATA, and CAS), tape, and optical storage can make up a storage infrastructure. Each storage type offers a different combination of cost, performance, reliability, and content preservation.

For many businesses, data represents a valuable asset that must be managed in a way that enables the business to realize its value. However, the complexity of data storage management has increased significantly due to the rate of growth, value to the business, and the wide variety of data types. Consequently, extracting value from data stores has become more and more dependent on the business's ability to manage metadata (i.e., "data about data")—such as who created a file, when it was last accessed, and so forth. To manage stores of data, businesses necessarily require the ability to describe the differences or changes in metadata describing the stores of data. For example, data backup, Storage Resource Management (SRM), mirroring, and search & indexing are just some of the applications that may need to efficiently discover and describe metadata changes associated with a data store.

Classic backup technologies can describe the changes in a dataset, including renames, deletes, creates, and modification of particular elements. However, their methods for finding the changes between the systems are extremely slow. They "walk" (traverse) the entire file system in a breadth-first or depth-first manner, taking advantage of none of the optimized dataset differencing tools that internal replication tools can utilize. To reduce backup media consumption and system load, backup applications sometimes run differential or incremental backups, in which they attempt to capture only the data that has changed from the previous backup. However, these differential or incremental backups tend not to run significantly faster than the full-system backup, because discovering and describing the changes takes so long.

SRM tools attempt to capture information about the locus of activity on a system. As with backup applications, finding out what parts of the system are active (usually done by determining what is modified) is extremely slow.

Mirrors have difficulty in resolving changes to both sides of a mirror. In mirroring, the data residing between mirrored systems can diverge when both sides of the mirror can be written. Asynchronous mirrors never have a completely current version of the source data. If the source becomes inaccessible and the mirror is brought online for user modification, each half of the mirror will contain unique data. The same can happen to a synchronous mirror, if both sides are erroneously made modifiable. In either case, to resolve the differences between the divergent mirrors will require discovering and describing those differences to the user.

To date, technologists have separated the problems of discovering and describing the changes between two datasets. For example, mirroring applications tend to be extremely efficient at discovering and replicating the changes between versions of a dataset. However, they are incapable of describing those changes at a level that is useful to a human user or another independent application. For example, they can tell a user which blocks of which disks have been changed, but they cannot correlate that information to the actual path and file names (e.g., "My Documents\2003\taxes\Schwab Statements\July"), i.e., "user-level" information.

Another technique, which is described in commonly-owned, co-pending U.S. patent application Ser. No. 10/776,057 of D. Ting et al., filed on Feb. 11, 2004 and entitled, "System and Method for Comparing Data Sets" ("the Ting technique"), can print out the names of files that are different between two datasets. However, the Ting technique does not attempt to describe a potential relationship between those differences. For example, a file may have been renamed from patent.doc to patent_V1.doc. The Ting technique would claim that one dataset had a file named patent.doc and the other has a file named patent_V1.doc; however, it would not look more deeply into the problem and declare that patent.doc had been renamed to patent_V1.doc. Understanding the relationships between the differences is a critical aspect of the overall problem. Moreover, the method of describing the changes in the Ting technique is relatively expensive and slow. The Ting technique was designed with the assumption that the differences will be very few, and that processing effort should therefore be expended in quickly verifying the similarities between the two datasets. This assumption does not often hold true in certain applications.

Another technique, which is described in commonly-owned, co-pending U.S. patent application Ser. No. 11/093,074 of T. Bisson et al., filed on Mar. 28, 2005 and entitled, "Method and Apparatus for Generating and Describing Block-Level Difference Information About Two Snapshots" ("the Bisson Snapshot technique"), can compare two datasets and identify block-level differences between the two datasets, by comparing block-level metadata between the first and second datasets, without comparing the contents of the data blocks of the datasets. The Bisson Snapshot technique, however, was designed with the assumption that the file system implemented by the storage server is known (i.e., file system specific information). This assumption does not necessarily hold true in certain applications.

A file system typically is a structuring of data and metadata on one or more storage devices that permits reading/writing of data on the storage devices (the term "file system" as used herein does not imply that the data must be in the form of "files" per se). Metadata, such as information about a file or other logical data container, is generally stored in a data structure referred to as an "inode," whereas the actual data is stored in data structures referred to as data blocks. The information contained in an inode may include, e.g., ownership of the file, access permissions for the file, size of the file, file type, and references to the locations on disk of the data blocks for the file. The references to the location of the file data blocks are provided as pointers in the inode, which may further reference indirect blocks that, in turn, reference the data blocks, depending upon the quantity of data in the file.

In a write in-place file system, the locations of the data structures, such as inodes and data blocks, on disk are typically fixed and changes to such data structures are made "in-place." In a write-anywhere file system, when a block of data is modified, the data block is stored (written) to a new location on disk to optimize write performance (sometimes referred to as "copy-on-write"). A particular example of a write-anywhere file system is the Write Anywhere File Layout (WAFL®) file system available from NetApp, Inc. of Sunnyvale, Calif. The WAFL® file system is implemented within a microkernel as part of the overall protocol stack of a storage server and associated storage devices, such as disks. This microkernel is supplied as part of Network Appliance's Data ONTAP® software.

The Bisson Snapshot technique uses on-disk information about the file system layout to identify changes between two file system versions. For example, in a write-anywhere file system, anytime the contents of an inode or a direct data block change, all of the pointers which point to that inode or block will also necessarily change. Thus, if two corresponding pointers are found to be identical, then all of the inodes which descend from those pointers must also be identical, such that there is no need to compare any of those inodes. If two corresponding pointers are found not to be identical, the process considers the next level of inodes in the inode tress, skipping any branches of the tree that are identical. However, in a write in-place file system, because changes to data structures are made "in-place," the same process cannot be used to identify changes.

BRIEF DESCRIPTION OF THE DRAWINGS

One or more embodiments of the facility are illustrated by way of example and not limitation in the figures of the accompanying drawings, in which like references indicate similar elements and in which.

DETAILED DESCRIPTION

The technology introduced herein includes an efficient way of identifying and characterizing metadata differences or changes between two datasets irrespective of the manner in which the data is stored (including the particular type of file system implemented by a storage server, e.g., write anywhere or write-in-place). It will be appreciated by those skilled in the art that the number of datasets compared to identify changes therebetween may be greater than two.

As used herein, a dataset is a logical container of structured, semi-structured, or unstructured data. For example, a file system is a dataset of abstract data types that are implemented for the storage, organization, manipulation, navigation, access, and retrieval of data. File systems typically define a hierarchical namespace that can be used to generate a list of files maintained by the file system (herein referred to as "a baseline"). In some embodiments, a "baseline" is a point-in-time representation (e.g., image) of a dataset stored on one or more storage devices (e.g., on disk) or in other persistent memory and having a name or other unique identifier that distinguishes it from other baselines generated at other points in time. A baseline may also include other information (metadata) about the dataset at the particular point in time that the baseline was generated, such as file metadata. File metadata may include, for example, a pointer to the tree structure of the file, the size (in kBytes) of the file, the number of blocks in the file, the link count (number of references to that file in the volume), file ownership, permissions associated with the file, access time/date, creation time/date, and so forth.

Baselines may be generated on a sporadic basis, on a periodic basis, when a threshold number of transaction requests (e.g., read, write, etc.) is reached, during periods of low activity, and so forth. To facilitate description, it is assumed that the two datasets are baselines of a file system (or a subset thereof) acquired at different points in time. In addition, the number of baselines retained by the facility is configurable by a user or administrator of the facility. For example, in some embodiments, a number of recent baselines are stored in succession (e.g., a few days worth of baselines each taken at four-hour intervals), and a number of older baselines are retained at increasing time spacings (e.g., a number of daily baselines for the previous week(s) and weekly baselines for the previous few months). However, it is contemplated that a variety of baseline creation techniques and timing schemes can be implemented.

In some embodiments, baselines are compared by progressively comparing corresponding hierarchical hashes of the baselines, to identify differences in individual entries of the baseline, each entry corresponding to an item of data stored in a volume of data (or dataset) represented by the baselines. The comparison does not require moving or copying of either baseline in the process. A human-readable report or catalog of the differences between the datasets is then generated, where the report indicates the metadata differences in individual baseline entries. Note that in this description, the terms "changes" and "differences" and variations of these terms are used interchangeably, to facilitate description.

The technology introduced herein is described as a hardware and/or software facility that includes a comparison unit and a catalog unit. The comparison unit compares hashes of a first dataset with corresponding hashes of a second dataset. In some embodiments, multiple levels of hashing are present. That is, the compared hashes may be generated from a number of hierarchical hash values. The facility identifies differences in metadata of the first and second datasets by progressively comparing the hierarchical hash values of the first and second datasets without comparing the metadata of the first and second datasets. The catalog unit generates a catalog of differences between the first and second datasets, the catalog indicates the differences in metadata of the first and second datasets.

Figure 1:
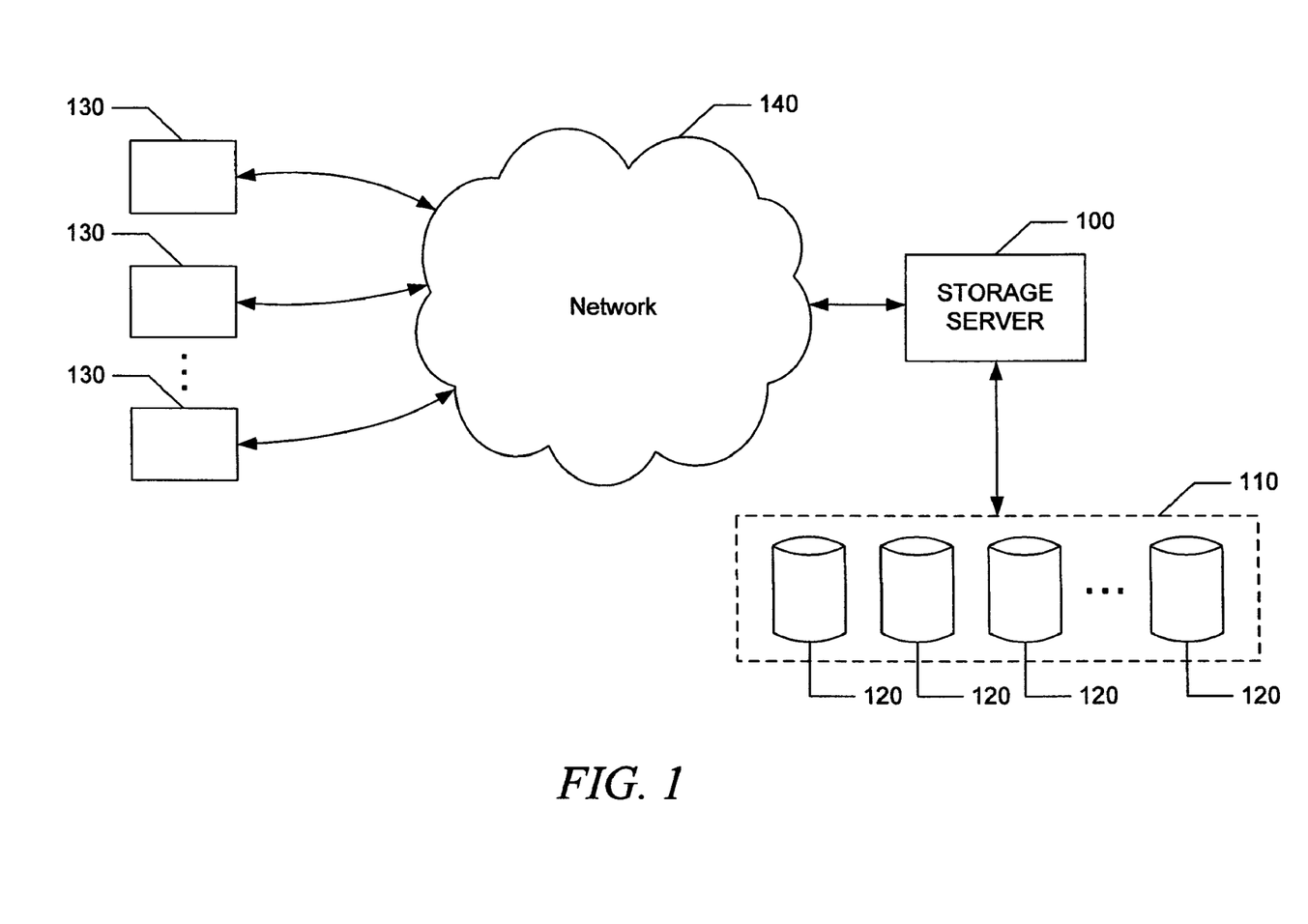
FIG. 1 is a data flow diagram of various components or services that are part of a storage network.

Before considering the facility introduced herein in greater detail, it is useful to consider an environment in which the facility can be implemented. FIG. 1 is a data flow diagram that illustrates various components or services that are part of or interact with the facility. A storage server 100 is connected to a storage subsystem 110 which includes multiple mass storage devices 120, and to a number of clients 130 through a network 140, such as the Internet or a local area network (LAN). The storage server 100 may be a file server used in a NAS mode, a block-based server (such as used in a storage area network (SAN)), or a server that can do both. Each of the clients 130 may be, for example, a personal computer (PC), workstation, server, etc. The storage subsystem 110 is managed by the storage server 100. The storage server 100 receives and responds to various transaction requests (e.g., read, write, etc.) from the clients 130 directed to data stored or to be stored in the storage subsystem 110. The mass storage devices 120 in the storage subsystem 110 may be, for example, magnetic disks, optical disks such as CD-ROM or DVD based storage, magneto-optical (MO) storage, or any other type of non-volatile storage devices suitable for storing large quantities of data. The storage devices 120 in storage subsystem 110 can be organized as a Redundant Array of Inexpensive Disks (RAID), in which case the storage server 100 accesses the storage subsystem 110 using one or more well-known RAID protocols.

In some embodiments, the facility introduced herein is implemented in the storage server 100, or in other devices. For example, the facility can be adapted for use in other types of storage systems that provide clients with access to stored data or processing systems other than storage servers. While various embodiments are described in terms of the environment described above, those skilled in the art will appreciate that the facility may be implemented in a variety of other environments including a single, monolithic computer system, as well as various other combinations of computer systems or similar devices connected in various ways. For example, in some embodiments, the storage server 100 has a distributed architecture, even though it is not illustrated as such in FIG. 1.

Figure 2:
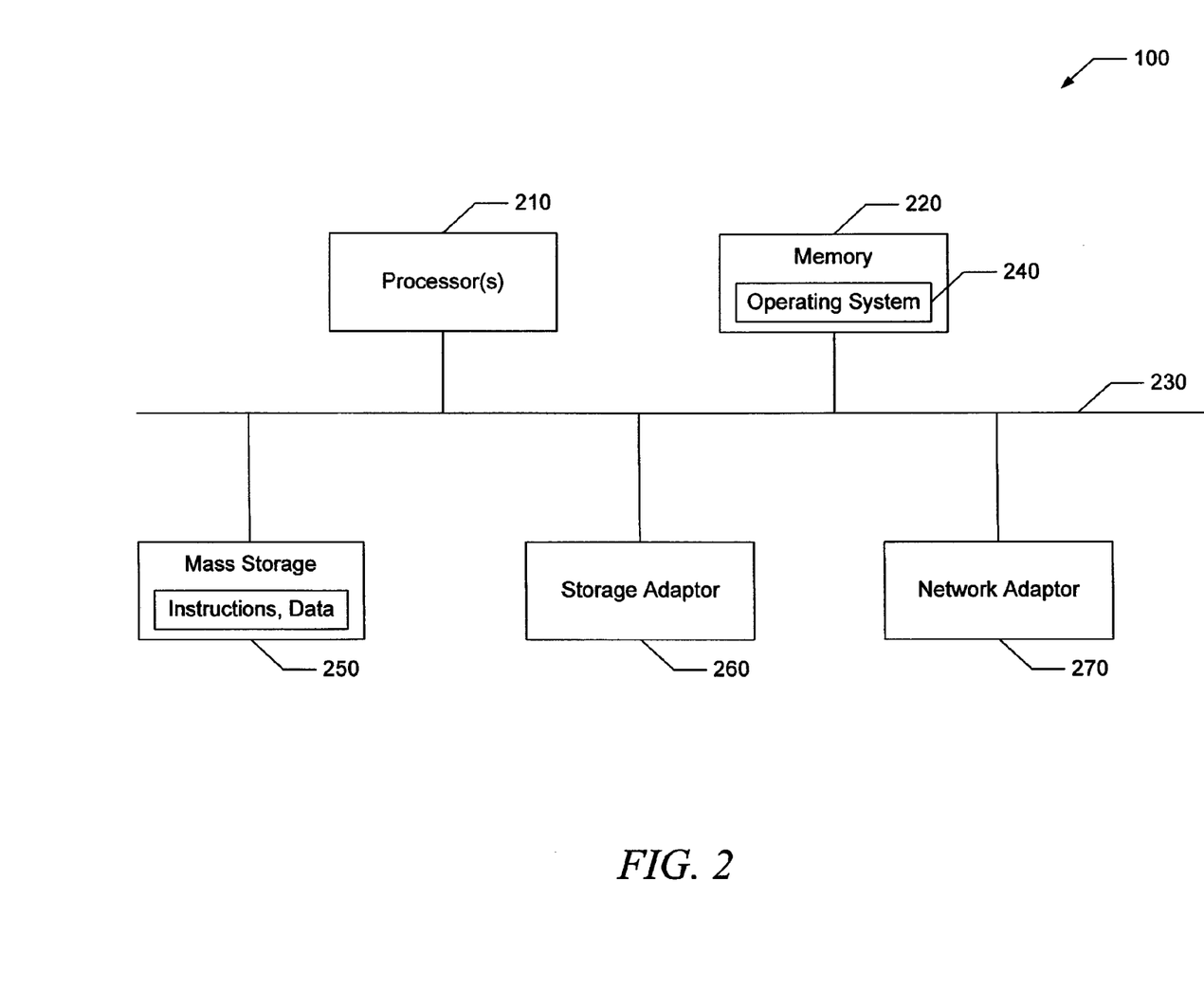
FIG. 2 is a high-level block diagram of a storage server.

FIG. 2 is a high-level block diagram showing an example of the architecture of the storage server 100. Certain well-known structures and functions have not been shown or described in detail to avoid obscuring the description. The storage server 100 includes one or more processors 210 and memory 220 coupled to an interconnect system 230. The interconnect system 230 shown in FIG. 2 is an abstraction that represents any one or more separate physical buses and/or point-to-point connections, connected by appropriate bridges, adapters and/ or controllers. The interconnect system 230, therefore, may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 210 are the central processing units (CPUs) of the storage server 100 and, thus, control its overall operation. In some embodiments, the processors 210 accomplish this by executing software stored in memory 220. A processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 includes the main memory of the storage server 100. Memory 220 represents any form of random access memory (RAM), read-only memory (ROM), flash memory, or the like, or a combination of such devices. Memory 220 stores (among other things) the storage server's operating system 240.

Also connected to the processors 210 through the interconnect system 230 are one or more internal mass storage devices 250, a storage adapter 260 and a network adapter 270. Internal mass storage devices 250 may be or include any conventional medium for storing large volumes of data in a non-volatile manner, such as one or more magnetic or optical based disks. The storage adapter 260 allows the storage server 100 to access the storage subsystem 110 and may be, for example, a Fibre Channel adapter or a SCSI adapter. The network adapter 270 provides the storage server 100 with the ability to communicate with remote devices, such as the clients 130, over a network and may be, for example, an Ethernet adapter, a Fibre Channel adapter, or the like.

Figure 3:
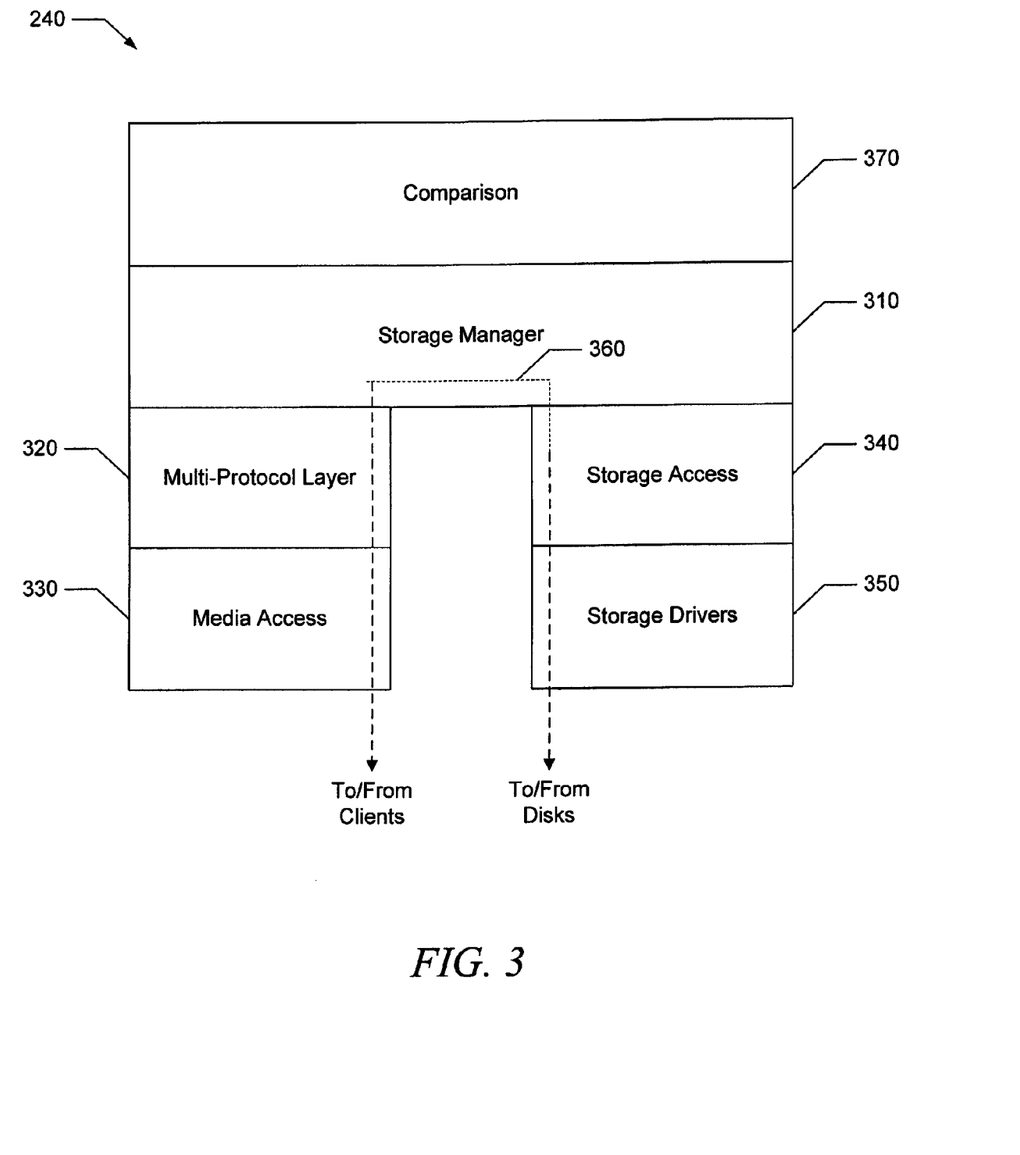
FIG. 3 is a high-level block diagram showing an example of an operating system of a storage server.

FIG. 3 shows an example of the architecture of the operating system 240 of the storage server 100. As shown, the operating system 240 includes several software modules, or "layers." These layers include a storage manager 310. The storage manager 310 is application-layer software that imposes a structure (hierarchy) on the data stored in the storage subsystem 110 and services transaction requests from clients 130. In some embodiments, storage manager 310 implements a write in-place file system algorithm, while in other embodiments the storage manager 310 implements a write-anywhere file system. Importantly, the facility introduced herein does not depend on the file system algorithm implemented by the storage manager 310. Logically "under" the storage manager 310, the operating system 240 also includes a multi-protocol layer 320 and an associated media access layer 330, to allow the storage server 100 to communicate over the network 140 (e.g., with clients 130). The multi-protocol layer 320 implements various higher-level network protocols, such as Network File System (NFS), Common Internet File System (CIFS), Hypertext Transfer Protocol (HTTP) and/or Transmission Control Protocol/Internet Protocol (TCP/IP). The media access layer 330 includes one or more drivers which implement one or more lower-level protocols to communicate over the network, such as Ethernet, Fibre Channel or Internet small computer system interface (iSCSI).

Also logically under the storage manager 310, the operating system 240 includes a storage access layer 340 and an associated storage driver layer 350, to allow the storage server 100 to communicate with the storage subsystem 110. The storage access layer 340 implements a higher-level disk storage protocol, such as RAID, while the storage driver layer 350 implements a lower-level storage device access protocol, such as Fibre Channel Protocol (FCP) or small computer system interface (SCSI). Also shown in FIG. 3 is the path 360 of data flow, through the operating system 240, associated with a transaction request.

In one embodiment, the operating system 240 also includes a comparison layer 370 logically on top of the storage manager 310. The comparison layer 370 is an application layer that generates difference information describing the differences between two or more baselines. In yet another embodiment, the comparison layer 370 is included in the storage manager 310. Note, however, that the comparison layer 370 does not have to be implemented by the storage server 100. For example, in some embodiments, the comparison layer 370 is implemented in a separate system to which baselines are provided as input.

To facilitate description, it is assumed that the storage server 100 is capable of generating or acquiring baselines, at different points in time, of all of the data which it stores (e.g., files and directories), or specified subsets of such data. However, the facility may be used to compare and characterize the differences between datasets other than baselines or different versions of a given dataset.

Figure 4:
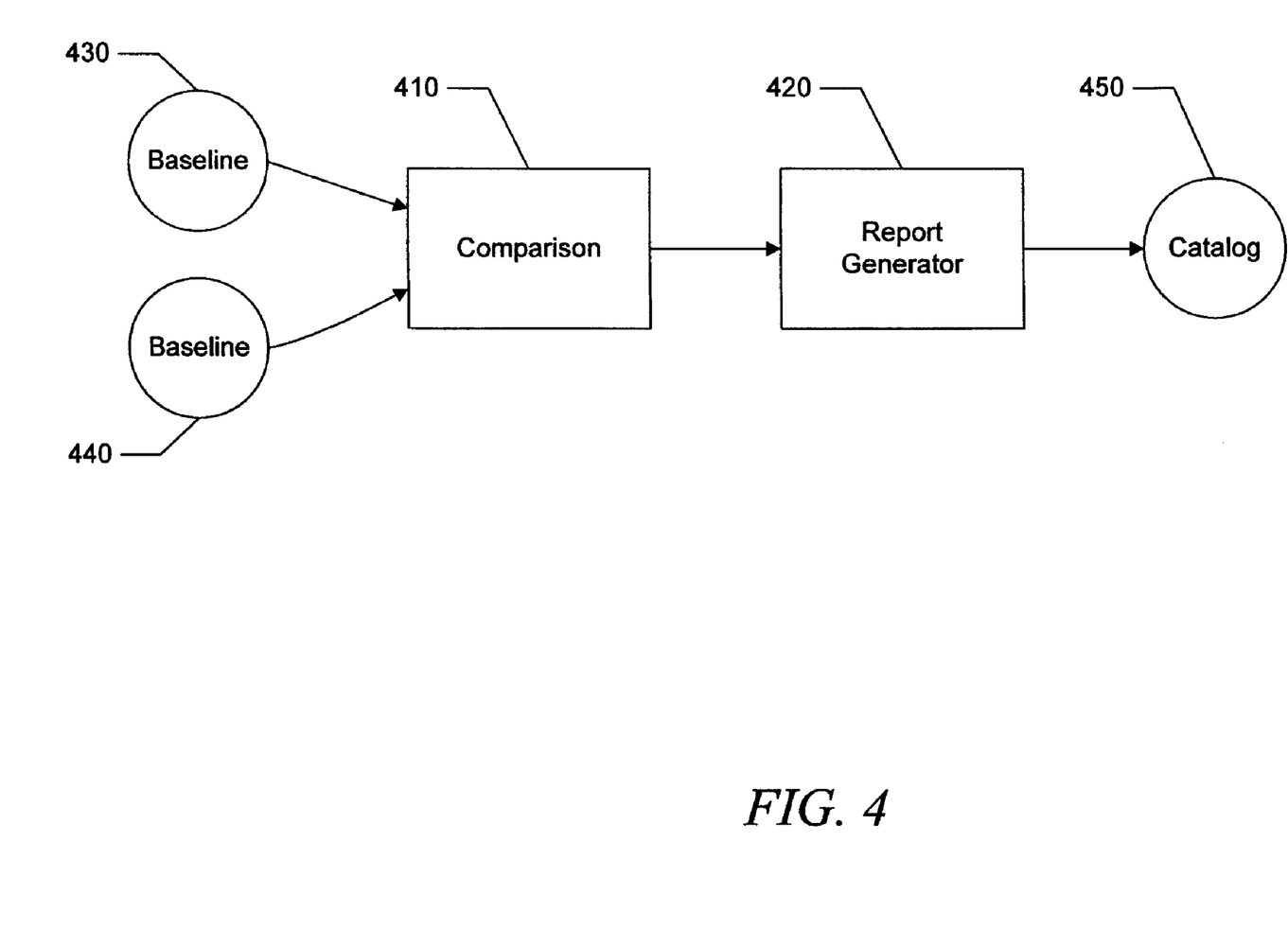
FIG. 4 illustrates the relevant functional elements of a comparison layer, according to some embodiments.

FIG. 4 illustrates the relevant functional elements of the comparison layer 370 of the operating system 240, according to one embodiment. The comparison layer 370 (shown in FIG. 4) includes a comparison unit 410 and a report generator 420. The comparison unit 410 receives as input two or more baselines 430 and 440 of a volume of data maintained by the storage server 100, acquired at two different points in time. The comparison unit 410 processes the baselines 430 and 440 to identify the differences therebetween. The report generator 420 processes generates a catalog of the differences identified by the comparison unit, including the locations associated with any changed items of data and the specific metadata changes. The catalog generated by the report generator 420 is in a human-readable form.

In some embodiments, the comparison unit 410 and report generator 420 are embodied as software modules within the comparison layer 370 of the operating system 240. In other embodiments, however, the functionality provided by these units can be implemented, at least in part, by one or more dedicated hardware circuits. The comparison unit 410 and report generator 420 may be stored or distributed on, for example, computer-readable media, including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), etc.) over a period of time, or they may be provided on any analog or digital network (packet switched, circuit switched, or other scheme).

Figure 5:
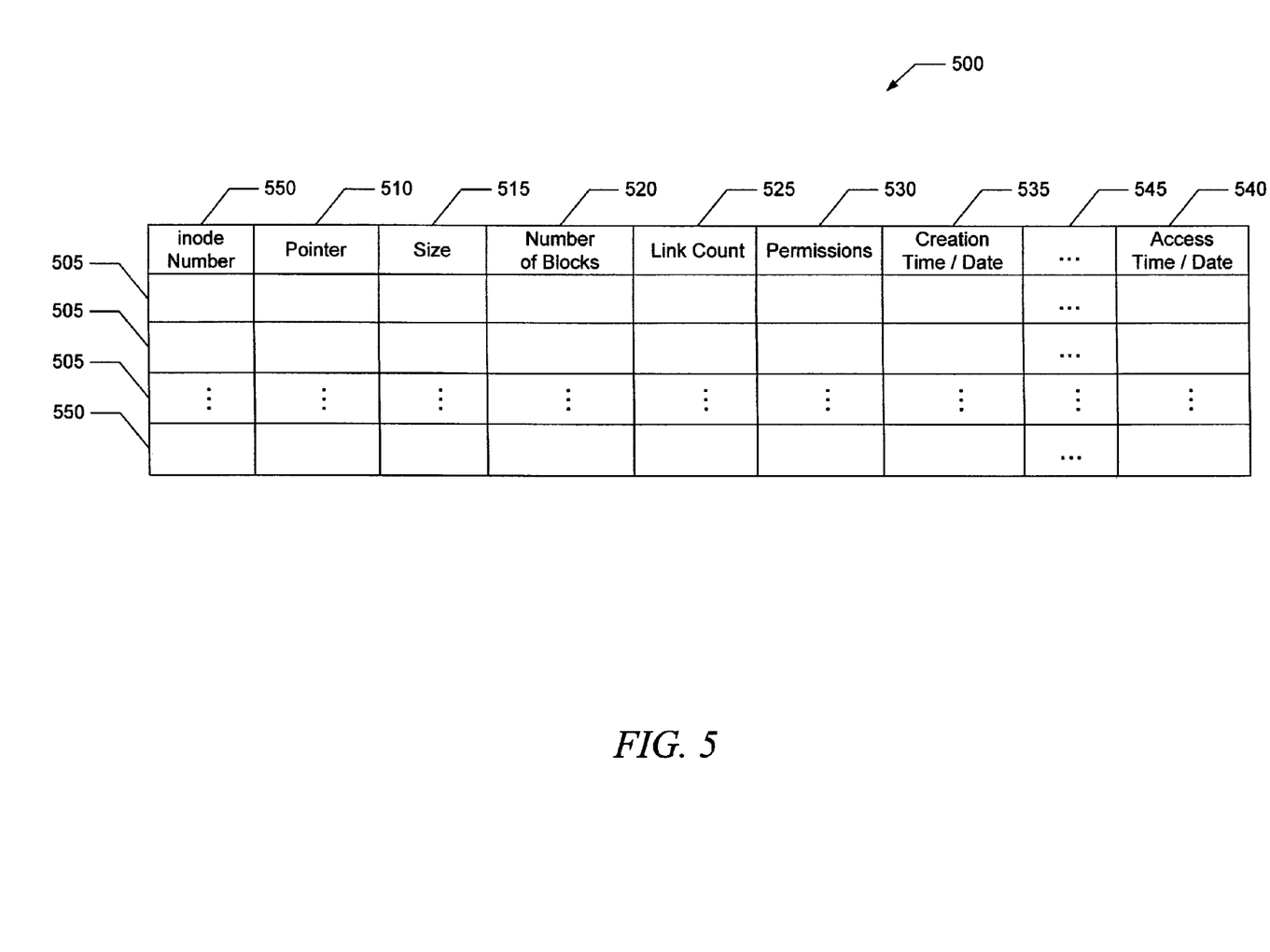
FIG. 5 illustrates an example of a baseline of a volume of structured or unstructured data.

FIG. 5 illustrates an example of the structure of a baseline 500, according to certain embodiments. A baseline may correspond to a specified set or subset of the data (e.g., a "volume" of data) maintained by the storage server 100. A volume may include items of data stored on one or more physical storage devices (e.g., storage devices 120). Note that an actual baseline of a volume of data is likely to be considerably more complex than baseline 500. Also, for simplicity, the underlying items of data and associated metadata are not shown.

Baseline 500 includes one or more entries 505, each representing an item of data, such as a file or directory. Each baseline entry 505 is divided into a number of metadata fields (sometimes referred to as "attributes") describing the item of data. For example, the metadata fields may include a pointer field 510, a size field 515, a number of blocks field 520, a link count field 525 (i.e., number of references to that item of data in the volume), a permissions field 530, a creation time/date field 535, and an access time/date field 540. Baseline entries 505 may include other metadata fields 545 not mentioned here.

As described here, the metadata associated with an item of data, such as information about a file, is typically stored in a unit of storage called an "inode," and the data structures used to contain the actual data are called data blocks. The information contained in an inode may include, e.g., ownership of the file, access permissions for the file, size of the file, file type, and references to the locations on disk of the data blocks for the file. The references to the location of the actual data are provided as pointers in the inode, which may further reference indirect blocks that, in turn, reference the data blocks, depending upon the quantity of data in the file. Each item of data in a volume has a separate inode which contains the item's metadata. Each baseline entry 505 is uniquely identified by the item's inode number (contained in inode number field 550) or other type of unique identifier field.

In some embodiments, the baseline includes an entry for every possible inode number. For example, if each inode number is 32 bits in length, a baseline will include approximately 4 billion entries ($2^{32}$), some of which will be empty. The number of empty entries is equal to approximately 4 billion minus the number of used entries. In some embodiments, the facility implements a baseline as a sparse file. A feature of a sparse file is that space is only allocated for meaningful (nonzero) data. That is, when space has been allocated to a sparse file, but not actually filled with data, it is not written to the file system. Instead, brief information about these empty regions is stored, which takes up much less disk space. These regions are only written to disk at their actual size when data is written to them.

As described herein, the facility introduced herein is independent of the file systems (write in-place or write-anywhere) that produced the data being compared and provides quick and efficient approach to identify changes between two datasets, such as two baselines representing a volume of data. For example, in some embodiments, the facility evaluates two baselines generated from the same volume of data at different points in time—an earlier-in-time baseline and a later-in-time baseline—and determines when an item of data has been added, deleted, or modified.

Figure 6:
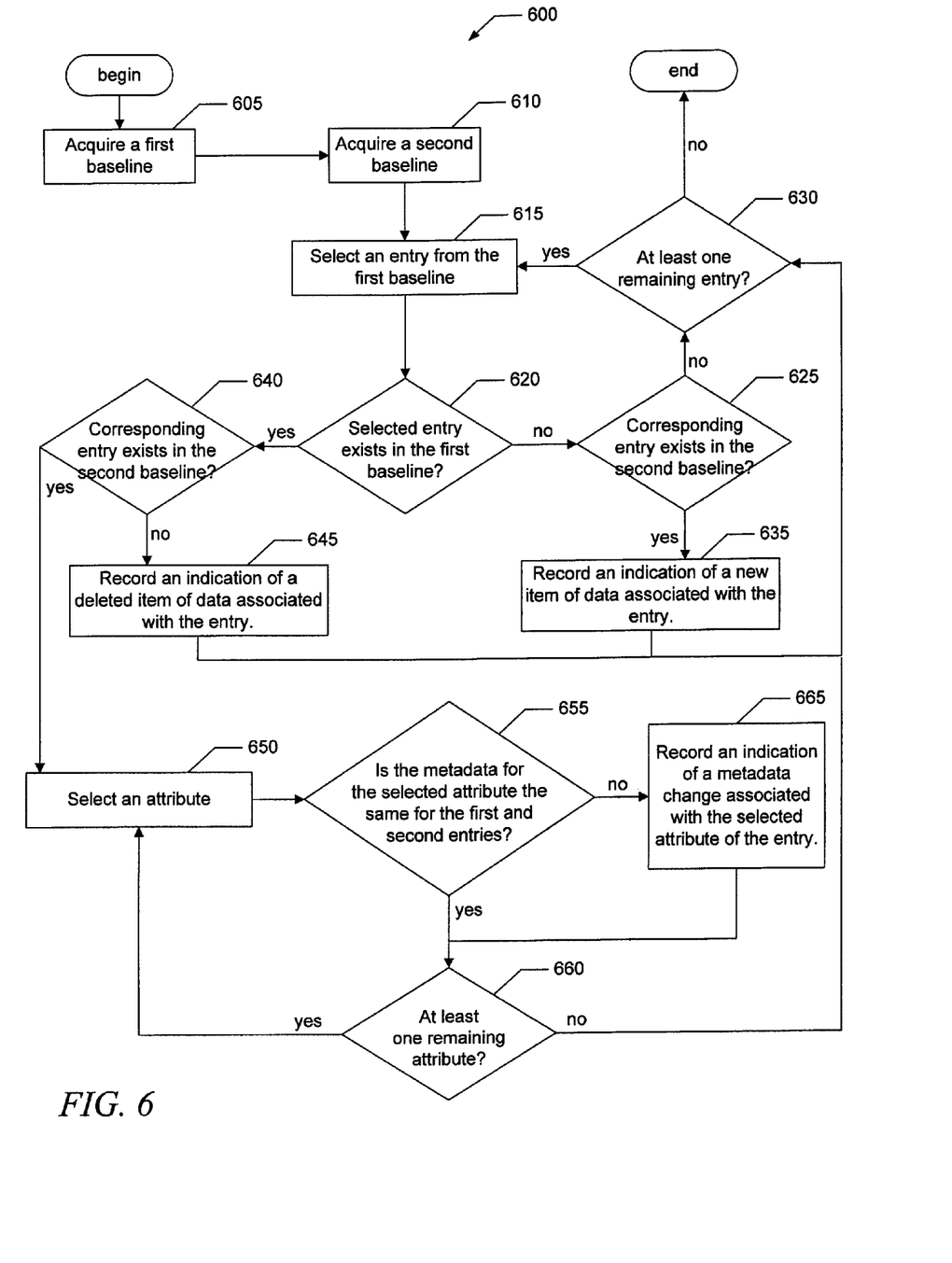
FIG. 6 is a flow chart of a comparison process performed by the facility, in some embodiments.

Typically, when an item of data is modified, added, or deleted, at least some of the metadata in that item's inode will change. By comparing corresponding entries of a first baseline 430 and a second baseline 440, the facility generates an incremental change list indicating the changes between the items of data represented by the first and second baselines. FIG. 6 is a flow chart of a process 600 performed by the facility in some embodiments to identify such changes. To facilitate description, the baseline which forms the basis of the comparison in the following process shall be referred to as the "first baseline" (430) and the other baseline shall be referred to as the "second baseline" (440). Note, however, that the "first baseline" is not necessarily the earlier baseline; the later baseline can be the "first baseline" and the earlier baseline can be the "second baseline."

Initially, at 605 the facility acquires a first baseline 430 of a volume of data. Next, at 610, the facility acquires a second baseline 440 of the volume of data. To facilitate description, it is assumed that the first and second baselines represent the same volume of data at different points in time. Further, those skilled in the art will understand that the facility may or may not generate one or both of the baselines. For example, in some embodiments, the first and second baselines are provided to the facility as input from another system.

After the first and second baselines are acquired, the facility proceeds to 615 where an entry 505 is selected from the first baseline 430. Next, at 620, the facility determines whether the selected entry exists in the first baseline (this may be accomplished, for example, by the comparison unit 410). That is, whether the selected entry is associated with an item of data. If the selected entry does exist in the first baseline, the facility proceeds to 640. If the selected entry does not exist in the first baseline, the facility proceeds to 625.

At 625, the facility determines whether a corresponding entry 505 exits in the second baseline 440 (this may be accomplished, for example, by the comparison unit 410). If a corresponding entry does not exist in the second baseline, this means that there was not (at the time the first baseline 430 was generated) and is not (at the time the second baseline 440 was generated) an item of data associated with the entry 505. In that case, the facility proceeds to 630 to determine whether there is at least one remaining entry 505 of the first baseline 430 to process. Otherwise, if at 625 the facility determines that a corresponding entry does exist in the second baseline, this means that the item of data associated with the entry 505 was created after the first baseline 430 was generated. In that case, the facility proceeds to 635 where an indication of a new item of data associated with the entry 505 is recorded (this may be accomplished, for example, by the report generator 420). After 635, the facility continues processing at 630, as described below.

At 640, the facility determines whether a corresponding entry 505 exists in the second baseline 440 (this may be accomplished, for example, by the comparison unit 410). If a corresponding entry does not exist in the second baseline, this means that item of data associated with the entry 505 was deleted after the first baseline 430 was generated. In that case, the facility proceeds to 645 where an indication of a deleted item of data associated with the entry 505 is recorded (this may be accomplished, for example, by the report generator 420). After 645, the facility continues processing at 630, as described below. Otherwise, if at 640 the facility determines that a corresponding entry does exist, this means that there was (at the time the first baseline 430 was generated) and is (at the time the second baseline 440 was generated) an item of data associated with the entry 505. In that case, the facility proceeds to 650.

At 650, the facility selects an attribute (e.g., 510) for comparison. Next, at 655, the facility determines whether the metadata for the selected attribute is the same for the selected first entry and corresponding second entry (this may be accomplished, for example, by the comparison unit 410). If the metadata for the selected attribute is the same, this means that the item of data has not changed with respect to the selected attribute, and the facility continues processing at 660, as described below. Otherwise, if the metadata for the selected attribute is not the same, this means that the item of data has changed. In that case, the facility proceeds to 665 where an indication of a metadata change associated with the entry 505 is recorded (this may be accomplished, for example, by the report generator 420). After 665, the facility continues processing at 660.

At 660, the facility determines whether there is at least one remaining attribute (e.g., 515) to process for the entry 505. If there is at least one remaining attribute, the facility continues processing at 650, as described above. Otherwise, the facility continues processing at 630. At 630, the facility determines whether there is at least one remaining entry 505 of the first baseline 430 to process. If there is at least one remaining entry, the facility continues processing at 615, as described above. Otherwise the facility ends processing.

Those skilled in the art will appreciate that the blocks shown in FIG. 6 and in each of the following flow diagrams may be altered in a variety of ways. For example, the order of certain blocks may be rearranged; certain substeps may be performed in parallel; certain shown blocks may be omitted; or other blocks may be included; etc.

Figure 7:
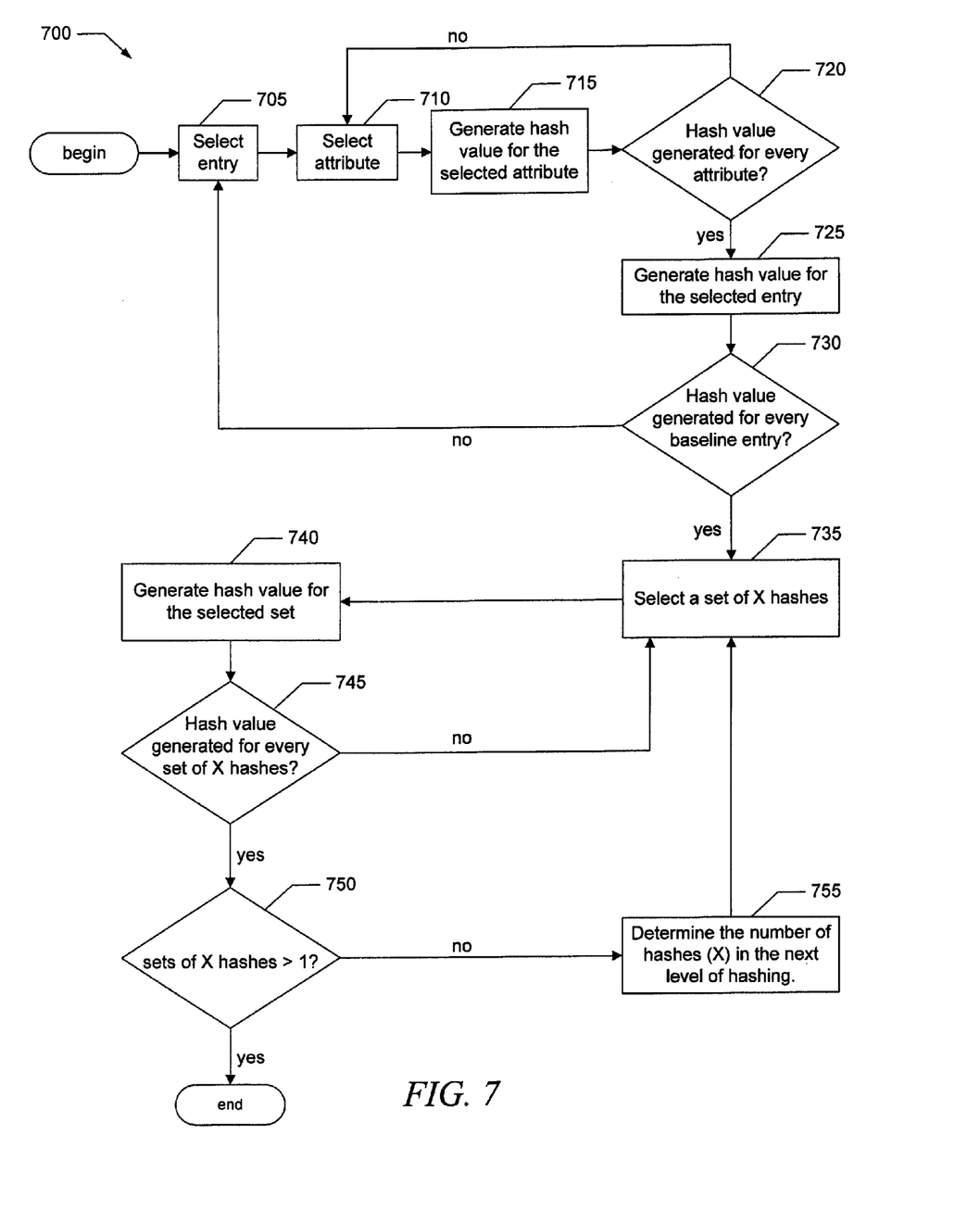
FIG. 7 is a flow chart of a process performed by the facility to generate a hierarchical hash of a baseline, in some embodiments.
Figure 8:
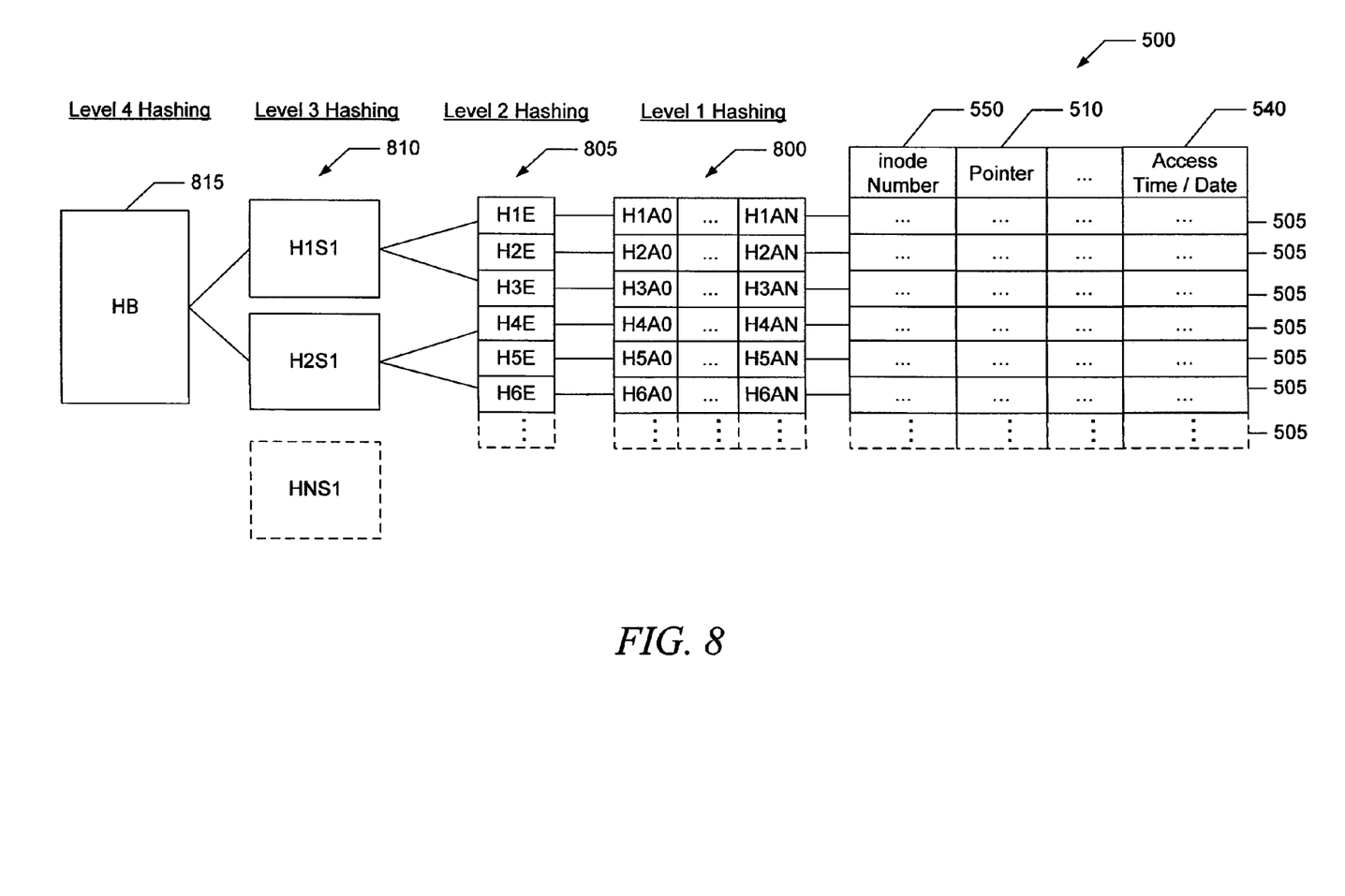
FIG. 8 illustrates an example of a hierarchical hash of a baseline.

In some embodiments, to reduce the amount of time and/or space necessary to compare two or more baselines, the facility generates a hierarchical hash of each baseline. FIG. 8 illustrates an example of a hierarchical hash of a baseline. FIG. 7 is a flow chart of a process 700 performed by the facility to generate a hierarchical hash of a baseline. Process 700 may be performed while a baseline is generated or after the baseline is generated. Process 700 may be triggered by a user command or it may be triggered automatically, such as at predetermined times or intervals or in response to a specified event.

At 705, the facility selects an entry 505 of a baseline. Next, at 710, the facility selects an attribute (e.g., 510) of the selected entry. At 715, the facility generates a hash value 800 associated with the selected attribute. Those skilled in the art will understand that a hash value can be generated using a variety of hash functions—such as SHA1, SHA256, SHA384, SHA512, Tiger, elf64, HAVAL, MD2, MD4, MD5, RIPEMD-64, RIPEMD-160, RIPEMD-320, WHIRLPOOL. A hash function is any well-defined procedure or algorithm for transforming some kind of data into a unique, relatively small value (sometimes referred to as a hash value, hash code, hash sum, or simply a hash). After 715, the facility proceeds to 720.

At 720, the facility determines whether a hash value 800 has been generated for every attribute (e.g., 510-545) of the selected entry. If a hash value 800 has not been generated for every attribute of the selected entry, the facility continues processing at 710, as described above. Otherwise, the facility proceeds to 725. At 725, the facility generates a hash value 805 for the selected entry. The hash value 805 for the selected entry may be generated, for example, by hashing the hash values 800 of the attributes of the selected entry. After 725, the facility proceeds to 730.

At 730 the facility determines whether a hash value 805 has been generated for every entry 505 of the baseline. If a hash value 805 has not been generated for every entry 505, the facility continues processing at 705, as described above, where the next entry of the baseline is selected. Otherwise, if a hash value 805 has been generated for every entry 505, the facility proceeds to 735.

At 735, the facility selects a set of X hashes 805. To facilitate description, it is assumed that the set of hashes 805 are each associated with an entry 505 of a set of X entries. However, those skilled in the art will appreciated that the set of X hashes 805 may correspond to hash values that are each associated with a set of entries. Therefore, the level of hashing performed by the facility is reflected by the number of sets of sets of hashes. Next, at 740, the facility generates a hash value 810 for the selected set by hashing the hash values 805 of the set. Then the facility proceeds to 745 to determine whether a hash value 810 has been generated for every set of X hashes 805. If a hash value 810 has not been generated for every set, the facility continues processing at 735, as described above. Otherwise, the facility proceeds to 750.

At 750, the facility determines whether there is more than one set of X hashes; that is, whether a single hash value 815 has been generated for the baseline. If a single hash value 815 has been generated, the facility ends processing. Otherwise, the facility proceeds to 755 to determine the number of hashes (X) in the next level of hashing. Then the facility continues processing at 735, as described above. In other words, the facility recursively loops through 735-755 until a single hash value 815 is generated for the baseline.

FIG. 8 is an example of a hierarchical hash of a baseline generated by process 700. Again, note that an actual baseline of a volume of data is likely to be considerably more complex than the baseline shown in FIG. 8, although the general approach described herein would still apply. For simplicity, the underlying items of data and associated metadata are not shown.

As described herein, the facility generates hash values 800 for each attribute 510-545 of each entry 505. Then, the facility generates a hash value 805 for each entry 505, by hashing the hash values 800 of the attributes of each entry. After generating a hash value 805 for each entry, the facility generates a hash value 810 for every set of X hashes 805, by hashing a set of hash values 805. As described herein, in some embodiments, the facility performs multiple levels of hashing. FIG. 8 illustrates four levels of hashing. The first level includes hashes 800 associated with attributes of a corresponding entry. The second level includes hashes 805 associated with entries. The third level includes hashes 810 of sets of hashes 805 associated with entries 505 of a baseline. The fourth level includes a hash 815 of sets of hashes 810 associated with sets of sets of entries 505 of the baseline. In some embodiments, a user or administrator establishes the level or hashing performed by the facility, while in other embodiments the facility automatically determines an efficient level of hashing. This may be determined, for example, by monitoring the transaction requests received, by taking into account prior levels of hashing for a particular interval of time (historical trends), the number of entries associated with items of data (meaningful data), etc. Those skilled in the art will appreciated that, under certain conditions, the facility may determine that a different level of hashing than that shown in FIG. 8 is appropriate.

The facility recursively hashes the generated hash values 805, 810, etc. until a single hash value 815 is generated for the baseline. By comparing a hash 815 of a baseline 430 representing a volume of data at a first point in time with a hash 815 of another baseline 440 representing the same volume of data at a second point in time, it is possible to determine whether the volume of data has changed between the first and second points in time. If the hash values 815 are identical, the volume of data has not changed. If the hash values 815 are different, the volume of data has changed (i.e., at least one item of data has been added, deleted, or modified).

Figure 9:
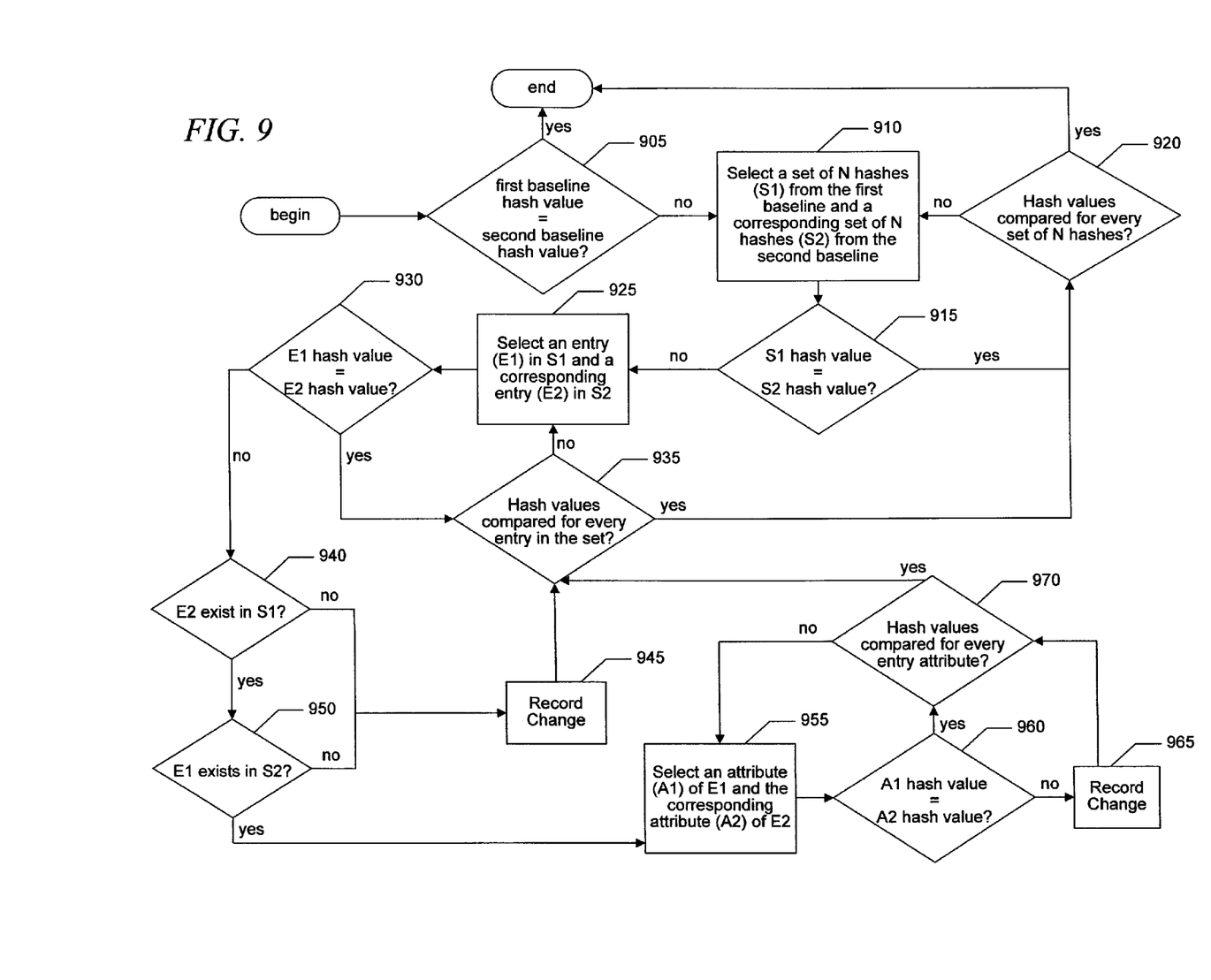
FIG. 9 is a flow chart of a comparison process performed by the facility, in some embodiments.

FIG. 9 is a flow chart of a process 900 performed by the facility to identify changes in one or more items of data represented by a baseline, in some embodiments. As illustrated, the facility progressively compares corresponding hashes for each level of hashing until it determines whether one or more items of data have changed. Note that the facility does not necessarily compare every corresponding hash for each level; instead, the facility compares corresponding hashes within a set of hashes only when the hashes compared at the preceding level (i.e., hashes generated from the set of hashes) are not identical. The facility generates an incremental change list describing the changes associated with items of data at the first and second points in time.

Initially, at 905 the facility compares a hash value 815 of a first baseline 430 with a hash value 815 of a second baseline 440. If the hash values are the same, this means that there is no difference between the volume of data at the first and second points in time, and the process ends. Otherwise, if the hash values are different, this means that there is at least one change in the volume of data between the first and second points in time, and the facility proceeds to 910.

At 910, the facility selects a set of N hashes associated with the first baseline 430 and a corresponding set of N hashes associated with the second baseline 440. Next, at 915, the facility compares the hash values (e.g., 810) of the sets of hashes to determine whether the dataset represented by the selected set of N hashes associated with the first baseline 430 is different from the dataset represented by the corresponding set of N hashes associated with the second baseline 440. If, at 915, the hash values are not the same, this means that there is at least change in the volume of data corresponding to the datasets represented by the sets of N hashes, and the facility proceeds to 925, as described below. Those skilled in the art will appreciate that, in some embodiments, the facility continues processing a subset of the selected set of N hashes (at 915) until the subset of N hashes correspond to hashes 805 of entries. To facilitate description, however, it is assumed that baselines 430 and 440 have four levels of hashing (as shown in FIG. 8). If at 915 the hash values are the same, the facility proceeds to 920 to determine whether the process has compared a hash value (e.g., 810) for every set of N hashes of the first baseline with a hash value (e.g., 810) of the corresponding set of N hashes of the second baseline. When the facility has compared a hash value for every corresponding set of N hashes, the process ends. Otherwise, the facility continues, processing at 910, as described above.

At 925, the facility selects an entry 505 from the selected set and a corresponding entry 505 from the corresponding set. Next, at 930, the facility compares a hash value 805 of the selected entry 505 with a hash value 805 of the corresponding entry 505. If the hash values 805 are not the same, this means that the item of data represented by the selected and corresponding entries 505 are different, and the facility proceeds to 940, as described below. Otherwise, if the hash values are the same, this means that the items of data represented by the selected and corresponding entries 505 are the same (i.e., no change), and the facility proceeds to 935 to determine whether a hash value 805 of every entry 505 of the selected set has been compared with a hash value 805 of a corresponding entry 505 of the corresponding set. If every entry 505 has not been compared, the facility continues processing at 925, as described above. Otherwise, the facility continues processing at 920, as described above.

At 940, the facility determines whether the corresponding entry 505 exists in the first baseline 430. If the corresponding entry 505 does not exist, this means that the item of data represented by the corresponding entry 505 was added after the first baseline 430 was generated, and the facility proceeds to 945 to record an indication of this change. Otherwise, if the corresponding entry 505 does exist in the first baseline 430, the facility proceeds to 950.

At 950, the facility determines whether the selected entry 505 exists in the second baseline 440. If the selected entry 505 does not exist, this means that the item of data represented by the selected entry 505 was deleted before the second baseline 440 was generated, and the facility continues processing at 945 to record an indication of this change. After 945, the facility continues processing at 935, as described above. However, if at 950 the facility determines that the selected entry 505 does exist in the second baseline 440, the facility proceeds to 955.

At 955, the facility selects an attribute from the selected entry 505 and a corresponding attribute from the corresponding entry 505. Next, at 960, the facility compares a hash value 800 of the selected attribute with a hash value 800 of the corresponding attribute. If the hash values 800 are the same, the facility proceeds to 970, as described below. Otherwise, if the hash values are not the same, the facility proceeds to 965 to record an indication of the change. After 965, the facility proceeds to 970 to determine whether a hash value 800 for every attribute of the selected entry 505 has been compared with a hash value 800 of a corresponding attribute of the corresponding entry 505. At 970, if every hash 800 of the selected entry 505 has not been compared, the facility continues processing at 955, as described above. Otherwise, the facility continues processing at 935, as described above.

By progressively comparing hashes 815, . . . , 810, 805 and 800 of every fixed set of hashes, it is possible to quickly identify and eliminate datasets of the volume of data which have not changed, and therefore, to quickly identify the items of data that have changed. More specifically, if any two corresponding hashes 815, 810, 805 are found to be identical between two baselines, then all of the hashes from which the hash was generated (and any hashes from which those hashes were generated) must also be identical, such that there is no need to compare any of those intervening hashes. If two corresponding hashes 815, 810, 805 are found not to be identical, the facility processes the next hashing level, skipping any hashes that are identical, until the changed entries 505 are identified. This approach allows modified (or added or deleted) items of data to be identified without having to examine the actual metadata of those items.

Figure 10:
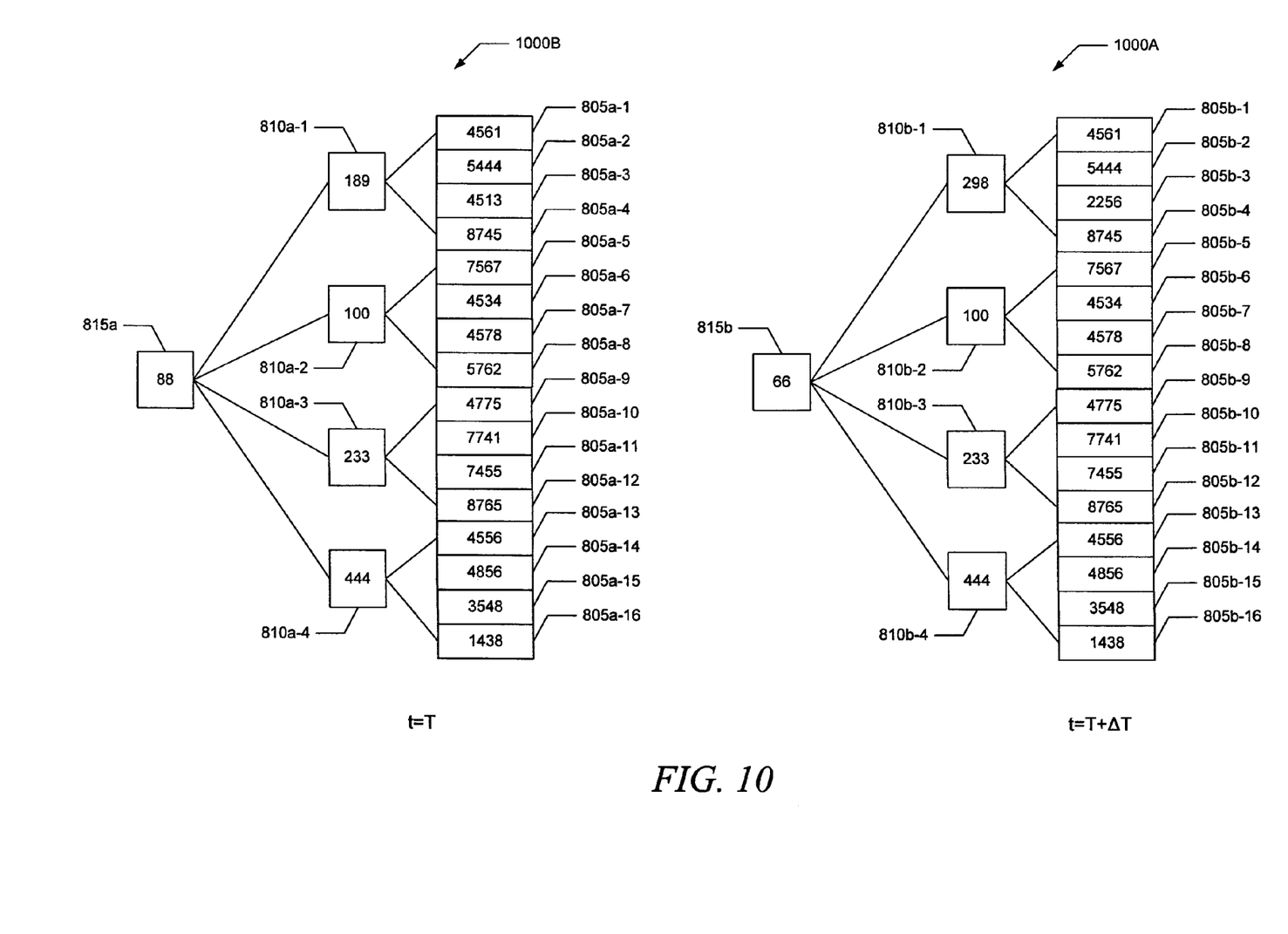
FIG. 10 is an example of two hierarchical hashes of a baseline representing a volume of data at a first and a second point in time.

Refer now to FIG. 10, which shows an example of a hierarchical hash 1000A of an earlier-in-time baseline 430 and a hierarchical hash 1000B of a later-in-time baseline 440. To facilitate description, it is assumed that hierarchical hash 1000A was generated at a time t=T, while hierarchical hash 1000B was generated at a time t=T+DELTA_T. For simplicity, the underlying baseline entries are not shown; only the hashes 805 associated with the entries are shown.

Hierarchical hashes 1000A and 1000B each include four levels of hashing: (1) a hash 800 per attribute per entry (not shown); (2) a hash 805 per entry; (3) a hash 810 per set of X hashes 805; and (4) a hash 815 per set of X hashes 810. Because the value of hash 815a is 88 and the value of hash 815b is 66, there is at least one difference in the volume of data, and the next hashing level is therefore evaluated. In some embodiments, the facility evaluates the hashes of a hashing level in parallel, while in other embodiments the hashes are evaluated sequentially. As illustrated in FIG. 10, hashes 810a-2, 810a-3, and 810a-4 are identical to corresponding hashes 810b-2, 810b-3, and 810b-4. As described above, because the corresponding hashes are identical there are no differences in the underlying items of data, and the facility does not review the next (or any subsequent) hashing level associated with these hashes. However, because the value of hash 810a-1 is 189 and the value of hash 810b-1 is 298, there is at least one difference in an item of data represented by hash 810a-1 and hash 810b-1, and the facility will therefore evaluate the next hashing level. That is, the facility compares hashes 805a-1, 805a-2, 805a-3, and 805a-4 with corresponding hashes 805b-1, 805b-2, 805b-3, and 805b-4. Because hashes 805a-3 and 805b-3 are not identical, the facility evaluates the next hashing level (not shown) to determine the metadata differences of the item of data represented by the entry from which 805a-3 and 805b-3 were generated.

To identify the metadata differences associated with an item of data (e.g., an inode), the facility compares corresponding hashes 800 of each attribute of the entry associated with the identified item of data. That is, once the entries are identified, the same approach is applied to the changed entries to identify the individual attributes that have changed. The hash comparison introduced herein produces a quick determination of whether the metadata of the corresponding entries (e.g., inodes) are different and allows a more time-consuming attribute-by-attribute comparison to be avoided if they are the same. That is, in some embodiments, it is sufficient to identify the attributes differences without comparing the metadata for the attributes.

After identifying the specific attribute differences, the facility stores certain information from the two inodes and information about the differences. For example, this information may be provided in a table, and include a separate entry for each pair of corresponding inodes that are found to be different between the two baselines. Each entry (e.g., for each changed item of data) may include, for example:

inode number of the item of data;
  timestamp to indicate the date/time of the relative create/modify;
  size of the item of data for both baselines;
  link count of the item of data for both baselines;
  number of data blocks in the item of data for both baselines;
  permissions of the item of data for both baselines;
  user ID to indicate the owner of the item of data for both baselines;
  group ID to indicate the group owner of the item of data for both baselines (A user belongs to at least one group. When a user creates an item, their initial group is used as the group ID for that item as well as their user ID);
  root inode number to identify the root inode attached to an item of data, for both baselines (This parameter is specific to Windows based file systems. A stream can hold information such as security information or "data." On a Unix based system, the root inode number for most files will be 0, because streams are not associated with Unix-based files);
  xinode number to identify the inode that contains the access control list (ACL) for a item of data, for both baselines (item of data may share xinodes if their content is the same. On a Unix based system, the xinode number for most files will be 0 for the same reasons as the root inode number);
  a set of bit flags, which can be used for any of various purposes (For example, one or more of the bit flags can be used to indicate the types of changes detected in the inode (e.g., a "ink count changed" bit flag, a "block count changed" bit flag, etc.). The manner in which the specific types of changes are identified is unimportant; any conventional technique for doing so can be used); and
  the number of common entries of the baselines or, conversely, the number of entries which changed between the baselines (Note that the number of common entries are applicable only for modified items, not for deleted or added items of data).

In certain embodiments of the invention, the facility stores difference information describing two or more baselines in two or more distinct files. For example, there may be file to record all deletions and another file to record all other types of differences (i.e., additions, modifies, renames). This approach is desirable if, for example, inodes can be reused. For example, assume a file "foo1" with inode number 100 is deleted between time T1 and time T2, and another file "foo2" is subsequently created between time T1 and T2 and assigned inode number 100. Without the use of two separate files, as just noted, it would be difficult if not impossible to distinguish this deletion and creation from a modify.

As described herein, the facility generates a report or catalog 450, i.e., a log file in human readable form. The catalog 450 includes the locations of the items of data for which differences were identified. The "location" of an item of data is the item's complete pathname, i.e., including the item name and the names of any directories and subdirectories in which the item is located, from the root of the volume to the item itself, in human-readable form.

The locations can be determined simply by "walking" the file system trees starting from the root nodes, and recording the various directories and subdirectories along the path to each changed item. A technique for quickly and efficiently walking a hierarchical dataset to identify locations of changed files and directories, which is suitable for this purpose, is described in co-pending U.S. patent application Ser. No. 10/954,381 of S. Manley et al., filed on the Sep. 29, 2004 and entitled, "Method and Apparatus for Generating User-Level Difference Information About Two Data Sets," ("the Manley technique"), which is incorporated herein by reference.

For each item of data for which a difference was identified between the baselines, the location of the item is determined and recorded in the catalog 450, along with information identifying (in human-readable form) the type(s) of difference(s) identified. The catalog 450 may have any desired format, such as a table of item names with their associated location and change information, a list, etc. For example, a typical entry in the catalog 450 might appears as follows:

Item "English_bulldogs" modified at blocks 4 and 16; location=/vol6/pushed_nose_dogs/bulldogs/English_bulldogs Thus, a facility for generating human-readable difference information about two datasets irrespective of the file system implemented by the storage server has been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A method of identifying differences between a first dataset and a second dataset, the method comprising:
    comparing, by a data storage system, a first hierarchical tree of metadata hashes representing the first dataset and a second hierarchical tree of metadata hashes representing a second dataset, the first and second datasets each including a plurality of data blocks of the data storage system, the first and second hierarchical trees each including a plurality of hierarchical hash values corresponding to metadata describing the plurality of data blocks included in the first and second datasets, the metadata including an inode indicator associated with the plurality of data blocks, to identify changes between the first and second datasets by progressively comparing the hierarchical hash values of the first and second hierarchical trees without comparing the metadata associated with the data blocks included in the first and second datasets, wherein:
        the first and second hierarchical trees each include a base layer of hashes and one or more upper levels of hashes, each upper level hash being a hash value of a corresponding subset of hashes from an immediately lower layer of hashes,
        each base layer of hashes includes a plurality of data-block level hashes, each data-block level hash corresponding to metadata associated with a given data block of the plurality of data blocks,
        each data-block level hash is a hash value of a plurality of attribute hashes, each of the plurality of attribute hashes corresponding to a hash value of a different attribute associated with a corresponding inode indicator, the different attributes including access attributes associated with a data block corresponding to the inode indicator; and
    generating, by the data storage system, a catalog indicating changes in metadata between the first and second datasets.

2. The method of claim 1 further comprising determining a location of at least one item of data in the first and second datasets for which a metadata change has been indicated; and
    including the location of the at least one item of data in the catalog.

3. The method of claim 1 wherein the first and second datasets each comprise a plurality of structured items of data.

4. The method of claim 1 wherein the first and second datasets are baselines of a file system at different points in time.

5. An apparatus comprising:
    a storage adapter through which to access a nonvolatile mass storage subsystem; and
    a processor coupled to the storage adapter;
    a comparison unit to compare a first hierarchical tree of metadata hashes representing a first logical data container and a second hierarchical tree of metadata hashes representing a second logical data container, the first and second logical data containers each referencing a plurality of data blocks in the nonvolatile mass storage subsystem, the first and second hierarchical trees each including a plurality of hierarchical hash values corresponding to metadata describing the plurality of data blocks referenced by the first and second logical data containers, the metadata including an inode indicator associated with the plurality of data blocks, to identify changes in metadata of the first and second logical data containers by progressively comparing the hierarchical hash values of the first and second hierarchical trees without comparing the metadata associated with the data blocks referenced by the first and second logical data containers, wherein:
        the first and second hierarchical trees each include a base layer of hashes and one or more upper levels of hashes, each upper level hash being a hash value of a corresponding subset of hashes from an immediately lower layer of hashes,
        each base layer of hashes includes a plurality of data-block level hashes, each data-block level hash corresponding to metadata associated with a given data block of the plurality of data blocks,
        each data-block level hash is a hash value of a plurality of attribute hashes, each of the plurality of attribute hashes corresponding to a hash value of a different attribute associated with a corresponding inode indicator, the different attributes including access attributes associated with a data block corresponding to the inode indicator; and
    a catalog unit to generate a catalog of changes between the first and second logical data containers, the catalog indicating changes in metadata between the first and second metadata containers.

6. The apparatus of claim 5 further comprising a monitoring unit to monitor transaction requests corresponding to items of data included in the first and second logical data containers and, based on a number of transaction requests, determine a level of hashing.

7. The apparatus of claim 6 wherein the monitored transaction requests are requests to store items of data.

8. The apparatus of claim 6 further comprising a hash-generating unit to generate the first and second hierarchical hashes based on the hashing level determined.

9. A processing system comprising:
    a processor; and
    a storage medium encoded with instructions that, when executed by the processor, cause the processing system to:

compare a first hierarchical tree of metadata hashes representing a first dataset and a second hierarchical tree of metadata hashes representing a second dataset, the first and second datasets each including a plurality of data blocks of the data storage system, the first and second hierarchical trees each including a plurality of hierarchical hash values corresponding to metadata describing the plurality of data blocks included in the first and second datasets, the metadata including an inode indicator associated with the plurality of data blocks, wherein:

the first and second hierarchical trees each include a base layer of hashes and one or more upper levels of hashes, each upper level hash being a hash value of a corresponding subset of hashes from an immediately lower layer of hashes,     each base layer of hashes includes a plurality of data-block level hashes, each data-block level hash corresponding to metadata associated with a given data block of the plurality of data blocks,     each data-block level hash is a hash value of a plurality of attribute hashes, each of the plurality of attribute hashes corresponding to a hash value of a different attribute associated with a corresponding inode indicator;

identify changes between the first and second datasets by progressively comparing the hierarchical hash values of the first and second hierarchical trees without comparing the metadata associated with the data blocks of the first and second datasets; and     generate a catalog indicating changes in metadata between the first and second datasets.

10. The processing system of claim 9 wherein the processing system comprises a storage server.

11. The processing system of claim 10 wherein the storage server generates the first and second hierarchical hashes.

12. The processing system of claim 9 wherein the first and second hierarchical hashes are acquired on a periodic basis.

13. The processing system of claim 9 wherein progressively comparing the hierarchical hash values further comprises:

determining that the metadata of the first dataset from which the hash value was generated is the same as the metadata from the second dataset from which the corresponding hash value was generated when a hash value of the first hierarchical hash is the same as a corresponding hash value of the second hierarchical hash.

14. The processing system of claim 13 wherein progressively comparing the hierarchical hash values further comprises:

comparing a next hash value of the first hierarchical hash with a corresponding next hash value of the second hierarchical hash when the hash value of the first hierarchical hash is different from the corresponding hash value of the second hierarchical hash; and     determining that the metadata of the first dataset from which the hash value was generated is different from the metadata from the second dataset from which the corresponding hash value was generated when the hash value of the first hierarchical hash is different from the corresponding hash value of the second hierarchical hash and there are no next hash values.

15. The processing system of claim 9 further comprising:

a storage interface to communicate with an array of storage devices to retrieve data from or store data to the array of storage devices; and     a network interface to communicate with at least one client over a network; the processing system being configured process transaction requests from the clients related to data stored in the array of storage devices.

16. The processing system of claim 9 wherein the first and second datasets are baselines of volume of data at difference points in time.

17. The processing system of claim 16 wherein the volume of data comprises unstructured data.

\* \* \* \* \*